US011120578B2

(12) United States Patent
Simpson et al.

(10) Patent No.: US 11,120,578 B2
(45) Date of Patent: Sep. 14, 2021

(54) METHOD OF COLOR MATCHING USING REFERENCE INDICATORS

(71) Applicant: C/O Anthropics Technology Limited, London (GB)

(72) Inventors: Ivor Simpson, Brighton (GB); Tony Polichroniadis, London (GB)

(73) Assignee: Anthropics Technology Limited, London (GB)

( * ) Notice: Subject to any disclaimer, the term of this patent is extended or adjusted under 35 U.S.C. 154(b) by 93 days.

(21) Appl. No.: 16/484,281

(22) PCT Filed: Jan. 26, 2018

(86) PCT No.: PCT/GB2018/050218
§ 371 (c)(1),
(2) Date: Aug. 7, 2019

(87) PCT Pub. No.: WO2018/146450
PCT Pub. Date: Aug. 16, 2018

(65) Prior Publication Data
US 2020/0034990 A1 Jan. 30, 2020

(30) Foreign Application Priority Data
Feb. 7, 2017 (GB) .................................... 1702008

(51) Int. Cl.
  *G06T 7/90* (2017.01)
  *A45D 44/00* (2006.01)
  *G06T 7/20* (2017.01)
(52) U.S. Cl.
  CPC .............. *G06T 7/90* (2017.01); *A45D 44/005* (2013.01); *G06T 7/20* (2013.01);
(Continued)

(58) Field of Classification Search
  CPC ........................ G06T 7/90; G06T 7/20; G06T 2207/10016; G06T 2207/10024; G06T 2207/30201;
(Continued)

(56) References Cited

U.S. PATENT DOCUMENTS

2002/0021439 A1* 2/2002 Priestley ................. G01J 3/524
  356/243.5
2003/0235333 A1 12/2003 Lin
(Continued)

FOREIGN PATENT DOCUMENTS

JP         H0996565 A       4/1997

OTHER PUBLICATIONS

International Search Report and Written Opinion from International Application No. PCT/GB2018/050218, 15 pages, dated Mar. 26, 2018, application now published as International Publication No. WO2018/146450 dated Aug. 16, 2018.

*Primary Examiner* — Tsung Yin Tsai
(74) *Attorney, Agent, or Firm* — Haynes and Boone, LLP (57) ABSTRACT

A computer-implemented method evaluates which of a set of reference indicators has colour attributes closest to those of an object. Each respective reference indicator has different colour attributes. The method comprises determining a colour relationship between the object and at least one reference indicator of a first type by analysing a plurality of image portions, each comprising at least part of the object and at least one reference indicator of the first type placed directly on the object. The image portions each have different lighting characteristics. The method also comprises comparing the determined colour relationship to known colour relationships associated with the at least one reference indicator, each known colour relationship representing a relationship between the reference indicator and another reference indicator of the set, to identify which reference indicator of the set has colour attributes closest to those of the object.

19 Claims, 3 Drawing Sheets

(52) U.S. Cl.
CPC ............ *G06T 2207/10016* (2013.01); *G06T 2207/10024* (2013.01); *G06T 2207/30201* (2013.01); *G06T 2207/30204* (2013.01)

(58) Field of Classification Search
CPC ........... G06T 2207/30204; G06T 2207/10152; A45D 44/005; G01J 3/463
See application file for complete search history.

(56) References Cited

U.S. PATENT DOCUMENTS

| | | | |
|---|---|---|---|
| 2007/0058858 A1* | 3/2007 | Harville | A45D 44/005 382/165 |
| 2007/0058859 A1* | 3/2007 | Baker | H04N 1/60 382/167 |
| 2007/0206850 A1* | 9/2007 | Lin | H04N 1/6016 382/162 |
| 2007/0242877 A1 | 10/2007 | Peters et al. | |
| 2013/0033590 A1 | 2/2013 | Yacoob et al. | |
| 2014/0267664 A1 | 9/2014 | Gross et al. | |
| 2015/0036924 A1* | 2/2015 | Kuusisto | G06K 9/4652 382/165 |
| 2015/0348245 A1 | 12/2015 | Horiuchi et al. | |
| 2016/0027190 A1* | 1/2016 | Minagawa | G06T 7/90 382/167 |
| 2017/0278289 A1* | 9/2017 | Marino | G06T 11/60 |
| 2020/0085171 A1* | 3/2020 | Metten | G01J 3/463 |

\* cited by examiner

METHOD OF COLOR MATCHING USING REFERENCE INDICATORS

CROSS REFERENCE TO RELATED APPLICATIONS

This application is a national phase filing under 35 U.S.C. § 371 of International Application No. PCT/GB2018/050218, filed Jan. 26, 2018; which claims the benefit of priority from Great Britain Patent Application No. 1702008.2, filed Feb. 7, 2017, the entire contents of which are hereby incorporated by reference.

FIELD

The present disclosure relates to a method for evaluating the colour attributes of an object, and in particular relates to a method of evaluating which of a set of different types of reference indicator has colour attributes closest to those of an object. In particular, the disclosure relates to a method for use in the cosmetics and fashion industries of aiding in the matching of the perceived colour of an unknown object, such as a user's skin, with the perceived colour of one of a range of known objects, such as a range of make-up products.

BACKGROUND

There are some applications where precisely determining the colour attributes of a material is important, for example in the cosmetics industry it is desirable to be able to determine the colour of skin in order to pick a suitable foundation product. Cameras can be used to measure the colour of light reflected by the skin, however a photograph is only representative of the perceived colour of a user's skin under the given fixed lighting conditions in place when the photograph was taken. A number of problems present themselves when trying to use such photographs and measurements in applications when there is no fixed lighting condition.

A camera captures light reflected by an object, however the light reflected by an object is dependent on the light incident upon it. For example, the perceived colour of white paper can be red under a red light, but blue under a blue light. It will thus be appreciated that different materials, having different inherent colour attributes, can produce the same reflected light when imaged under different lighting conditions. At best, any determination of the colour attributes of an object based on an image will only be with respect to the lighting conditions which were present when the image was taken, and the determined colour attributes will not necessarily provide a suitable match for the object across a range of lighting conditions. In addition, cameras include software and hardware that can change the exposure and colour characteristics of pixels in resultant images, which adds a further level of unknown variables when attempting to determine the colour attributes of an object in an image.

Additional problems may also present themselves when attempting to determine the colour of an object from an image, including metameric failure. Metameric failure occurs when two materials having different colour attributes appear to have the same perceived colour in first lighting conditions, but appear to have a different perceived colour in second, different lighting conditions. In brief, this happens because light can be described as a continuous function of wavelength, with a given amplitude at a particular wavelength. When light is incident on a material's surface, some wavelengths are absorbed and others are reflected, and light is emitted or reflected from the surface of the material in different directions. The absorbance and reflectance behaviour of a material can be complex, and can be dependent on the direction in which the light is incident upon the material.

When the human eye perceives the colour of light, it does so via three response functions, with peaks roughly corresponding to red green and blue. When light is incident on the human eye, in order to determine the colour of the incident light the human eye effectively integrates the amplitude of the incoming light multiplied by its three response functions. Metamerism occurs because each colour response of the human eye can be activated across a broad range of wavelengths, so that different amplitudes of light across all wavelengths can produce an equivalent receptor response. Thus, objects which in fact have different colour attributes can appear to be the same colour.

The phenomenon of metamerism can introduce large errors when attempting to determine the true colour properties of an object from an image, in particular when analysis is performed without knowledge of the lighting conditions at the time the image was taken.

Because conventional cameras work in a similar way to the human eye, there is no way for a conventional camera to know about the exact wavelengths of light that produced a given colour. Essentially the camera is blind to the exact reflection properties of a surface.

Locally varying lighting conditions can also be an issue. In some circumstances, the light reflected and/or emitted by an object can vary greatly with small changes in the orientation of the object and/or a light source. For example, the colour properties of even nearby pixels of an image of the object can vary greatly if the image contains the boundary of a shadow. Variance of the lighting conditions in an image can make it difficult to measure the colour of a material or object.

Cosmetic companies currently offer a service wherein a user uploads an image of their face, and the colour of the pixels associated with the user's face can be analysed, allowing a 'best-match' of a foundation colour to be suggested. Such approaches assume: a 'typical' lighting condition, what camera exposure level has been used, and internal camera software settings. However, in view of the above considerations, such a suggested foundation colour is not necessarily a good match for the user's skin.

The present disclosure seeks to mitigate these and other problems.

SUMMARY

According to an aspect, there is provided a computer-implemented method for evaluating which of a set of different types of reference indicator has colour attributes closest to those of an object, wherein each respective type of reference indicator has different colour attributes. The method comprises determining a colour relationship between the object and at least one reference indicator of a first type by analysing a plurality of image portions, each image portion comprising at least part of the object and at least one reference indicator of the first type. The image portions each have different lighting characteristics. The method also comprises comparing the determined colour relationship to known colour relationships associated with the at least one reference indicator, each known colour relationship representing a relationship between the reference indicator and another reference indicator of the set of different types of reference indicator. In a preferred embodiment, the comparison is performed to identify which of the set of different types of reference indicator has colour attributes closest to those of the object.

Optionally, the at least one reference indicator of a first type may be placed directly on the object.

For example, two image portions may have different lighting characteristics if they are taken from images which have different lighting characteristics. An image has lighting characteristics which are dependent on a lighting condition when the image was taken. Examples of changing lighting conditions include the frequency of light being changed, the intensity of light being changed, the orientation of the object in the image and a light source being changed.

Colour attributes can be described as the properties of an object or material which give rise to perceived colours. An object with particular colour attributes can have a range of perceived colours, depending on the lighting conditions.

The concept of closest colour attributes may be the closest perceived colour, and in particular the closest perceived colour across a wide range of lighting conditions.

The image portions may be portions of at least one image, wherein the image portions have been identified as comprising at least one reference indicator of the first type.

The method may also comprise receiving image data representative of the at least one image, the at least one image comprising the object and at least one reference indicator of the first type.

The at least one image may be a plurality of images, each respective image of the plurality of images comprising the object and a reference indicator of the first type.

The plurality of images may be still frames from a video. The video may depict the object and at least one reference indicator of the first type rotating together. As discussed below, this technique is particularly suitable for obtaining images having a variety of lighting conditions.

The at least one image may comprise the object and a plurality of reference indicators, the plurality of reference indicators each being of the first type.

The known colour relationships may be pre-determined based on an analysis of the set of different types of reference indicator in different lighting conditions. The known colour relationships may be, for example, stored in a library or reference table.

The method may further comprise analysing the at least one image to identify the plurality of image portions. Identifying the plurality of image portions may comprise manual or automatic identification of a reference indicator in a first image of the plurality of images.

Once a reference indicator has been identified, an image portion may be extracted for analysis, which contains the reference indicator and a surrounding region of the object.

The at least one image may be a plurality of images comprising still frames from a video, and the method may further comprise tracking the movement of the object in the video and identifying the plurality of image portions in the plurality of images based on said tracking and the manual or automatic identification of at least one reference indicator in the first image. This is a particularly efficient manner of identifying the reference indicators in the images.

Each respective image portion may comprise a reference indicator region associated with a reference indicator of the first type, and an object region associated with the object. The reference indicator region for each respective image portion may comprise a first set of pixels associated with a reference indicator of the first type, and the object region for each respective image portion may comprise a second set of pixels associated with the object.

The method may further comprise determining, for each respective image portion, an average colour for the reference indicator region and an average colour for the object region. The average colour for the reference indicator region may be an average of the colour values of the pixels associated with the reference indicator region, and the average colour for the object region may be an average of the colour values of the pixels associated with the object region. The average colours may be determined using a median average of pixel colour values.

The method may further comprise determining the spread of the pixel colour values associated with the reference indicator region. The method may comprise determining the spread of the pixel colour values associated with the object region. The method may comprise performing both of these determinations. If a determined spread is above a threshold value, the image portions wherein the spread is above the threshold spread value may be discarded from analysis. Determining the spread may comprise determining the standard deviation. The threshold spread value may be pre-determined based on an analysis of test image portions, wherein an object comprised in the test image portions has known colour attributes.

The method may further comprise determining the colour relationship based on the average colour values from each image portion.

The at least one reference indicator of a first type may comprise a thin layer.

According to an aspect, a computer readable medium is provided comprising computer-executable instructions which, when executed by a processor, cause the processor to perform the method described above and herein.

According to another aspect, a computer system is provided comprising at least one processor and at least one memory, the system configured to perform the method the method described above and herein.

FIGURES

Specific embodiments are now described, by way of example only, with reference to the drawings, in which.

DETAILED DESCRIPTION

The present disclosure relates generally to analysing images of an object and a reference indicator, in order to determine a match between the colour attributes of the object and one of a set of reference indicators having known colour attributes. In a preferred embodiment, the object can be a user's face, or another region of a user's skin, and the reference indicator can be a cosmetics substance such as a foundation. A colour relationship between the user's skin and a first type of foundation can be determined from the measured colour of the skin and the measured colour of the foundation in multiple images taken in different lighting conditions. The determined relationship can be compared to known relationships between several types of foundation, for example a reference table or a library of pre-determined relationships between known foundations. This comparison allows a determination of which foundation of the known foundations has colour attributes which are the closest match to the colour attributes of a user's skin.

Figure 1:
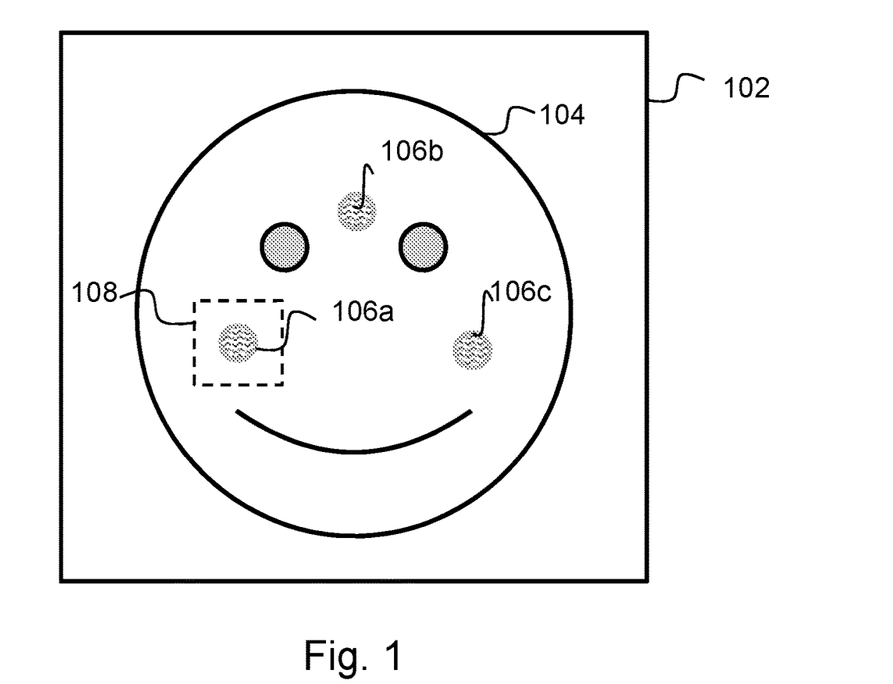
FIG. 1 depicts an image of an object, in this example a user's face, with a number of reference indicators placed thereon.

FIG. 1 shows an image 102, for example a photograph. The image 102 shows an object, in this example a user's face 104. The user's face 104 has a plurality of reference indicators 106a-c placed thereon. In this example, the image 102 is a still frame from a video. The video has been captured by a user, and contains several still frames which each comprise an image 102 of the user's face 104 with the reference indicators 106a-c placed thereon. It will be appreciated that a video can be described as comprising a plurality of images or still frames. These still frames preferably show the user's face 104 in a variety of lighting conditions.

It has been found that a particularly good way of obtaining suitable still frames is for a user to take a video of their face while turning through a large angle, for example by turning in a full circle. This way, if for example the user takes a video of their face 104 in a room illuminated by a light bulb, during the course of the video the user's face 104 is illuminated by the light bulb from a variety of angles. The resulting video will thus comprise a plurality of images, with some of the images likely showing the user's face 104 illuminated directly by the light bulb, and some of the images likely showing the user's face 104 not directly lit by the light bulb. In all cases, the user's face 104 will also be lit by light which has been reflected, for example, from the walls and other objects in the room. The amount of light reflected and absorbed by an object varies with the angle of incidence of the light striking the object, and this method of obtaining images therefore provides a plurality of still frames of the user's face 104, and the reference indicators, under different lighting conditions. This in turn helps to counter errors associated with unknown lighting conditions and metameric failure by allowing an average to be taken over a set of different lighting conditions.

As will be appreciated by the skilled person, image data representing the image 102 can be stored on a computer or other computer readable memory. An image can be rasterized into a matrix or grid of pixels, and the resulting image data typically comprises information about the colour of pixels in the image. The pixels which make up the image 102 shown in FIG. 1 are not shown in FIG. 1.

Once a plurality of still frames of a user's face 104 has been obtained, each image of the plurality of still frames/ images is analysed. In methods according to the present disclosure, multiple images, such as the image 102 shown in FIG. 1, or image data representative of such a plurality of images, are received by a processor for analysis.

In a first analysis step, a first image is analysed to identify the presence of reference indicators in the image. This step can be performed automatically using known image segmentation techniques. Each respective image 102 is analysed to identify reference indicators 106a-c.

The identification of reference indicators 106a-c in the images may also be assisted by manual input. For example, the identification can be aided by allowing a user to manually identify the location of the reference indicators 106a-c in the images. This can be accomplished in a variety of ways. For example, the user can be shown the images successively on a touch-screen display, and be asked to tap or otherwise indicate the locations of the reference indicators 106a-c in each image 102.

Alternatively, the user can tap or otherwise indicate the locations of the reference indicators 106a-c in an initial image 102, and the location of the reference indicators 106a-c can be 'tracked' using known facial recognition and/or video tracking software. Such video tracking applications can be implemented using, for example, an open source computer vision and machine learning software library such as OpenCV software (opencv.org). Known tracking techniques allow the tracking of, for example, a face through a video. The user's indication of the location of one or more reference indicators 106a-c in one of the frames of the video, for example the initial frame, allows the position of each reference indicator to be identified in every other frame. In other words, based on knowledge of how the object moves throughout the still frames of a video and an indication of where the reference indicators are located in at least one frame of the video, the location of the reference indicators 106a-c in each still frame can be extrapolated. For embodiments which use video tracking, the reference indicator should have a fixed position relative to the object. This is the case in an example where the reference indicators are blobs/regions of foundation placed directly on a user's face 104.

Once each image has been analysed and reference indicators 106a-c have been identified in images across the plurality of images, it is possible to define portions of the images which contain a reference indicator, or at least part of a reference indicator. These image portions are then stripped out from each image for further analysis. In the example image 102 shown in FIG. 1, the three reference indicators 106a-c shown would be identified, and three corresponding image portions would be extracted from the image. It will be appreciated that there may be any number of reference indicators 106a-c present in each image. If an image is analysed and no reference indicators 106a-c are identified, then no portions of that image are carried forward and the image is discarded from the analysis.

Figure 2:
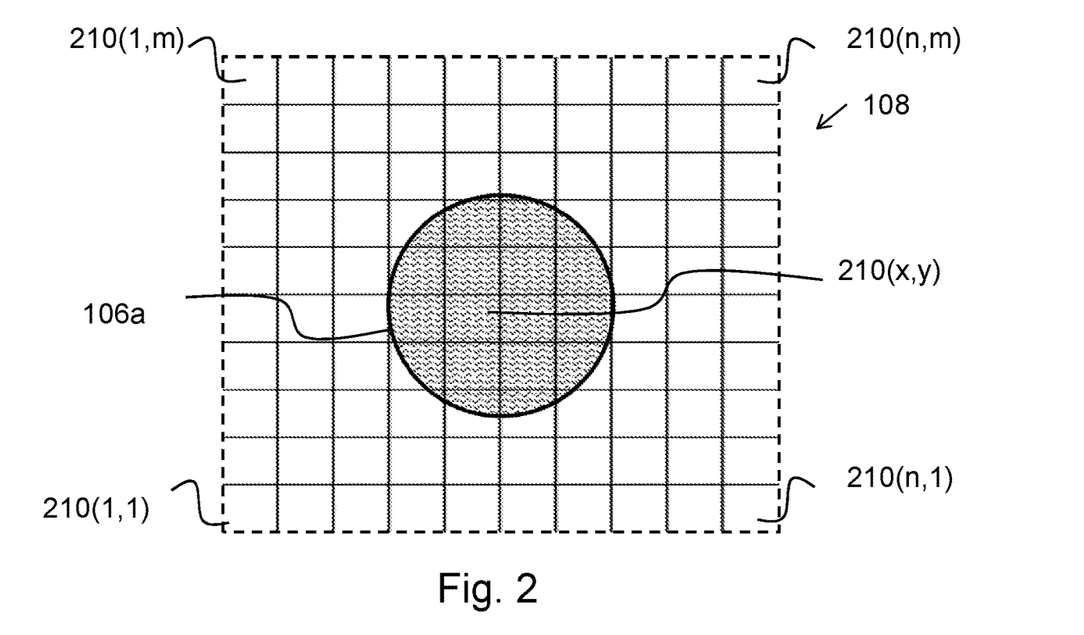
FIG. 2 depicts a portion of the image of FIG. 1 containing a reference indicator.

An identified portion 108 of the image 102, or image portion 108, can be described as a region of the image 102 which surrounds the identified reference indicator 106a. This could be as simple as a small rectangle or oval which includes the reference indicator 106a and a small patch of skin around it. In this manner, the images are processed to identify portions of the image 102 which contain the reference indicator 106a and a surrounding region of the user's skin. In principle, portions of any size can be analysed, however it is preferable that the image portions 108 capture a relatively small region of skin surrounding the reference indicator, so that the region of skin to be analysed in each image portion 108 is close enough to the reference indicator 106a that the surface normals of the skin are very close to the surface normals of the reference indicator 108.

FIG. 2 shows a portion 108 of the image 102 of FIG. 1 which has been identified as containing a reference indicator 106a. The portion of the image 102 is denoted by a dashed box in FIG. 1. The portion 108 of the image 102 contains a reference indicator 106a and a region of the user's skin which is proximate to the reference indicator. As can be seen in FIG. 2, the portion of the image 102 is comprised of a number of pixels 210. The matrix of pixels 210 shown in FIG. 2 has n pixels in an x co-ordinate direction, and m pixels in a y-co-ordinate direction. Each pixel has a respective value which is representative of colour. The value representative of colour may be represented, for example, using a colour model, for example using three component intensities via the sRGB model or the LMS colour space. Each pixel's vector value may be referred to as a colour value.

As described above, each image portion 108 comprises a reference indicator region associated with the reference indicator 106a, and an object region associated with the object, e.g. the user's face 104. It is possible to use known image segmentation techniques to delineate these regions, for example to identify a first set of pixels associated with a reference indicator 106a, and a second set of pixels associated with the object 104. In the example shown in FIG. 2, each of pixels 210 (1, 1); 210 (1, m); 210(n, 1) and 210(n,m) and their surrounding pixels form part of the object region, and pixel 210 (x,y) and its surrounding pixels form part of the reference indicator region.

Many methods for segmenting pixels into at least two separate sets in this manner are known to the skilled person, one example being a method known as Graph Cuts. Other possible methods of image segmentation are known, for example some may involve cluster analysis techniques. Labels can be assigned to each pixel 210, such that pixels associated with the reference indicator are labelled accordingly. Pixels associated with the user's face 104 may also be labelled. Thus, in each image portion 108, the pixels which are associated with the reference indicator 106a and the pixels which are associated with the object 104 are identified.

The pixels which have been identified as being associated with the reference indicator 106a each have a measured colour value representative of the colour of the reference indicator 106a in the lighting condition of the image 102 the image portion 108 was taken from. The remaining pixels in the image portion 108 have a measured colour value representative of the colour of the user's skin, importantly, in the same lighting condition. Thus, in each image portion 108 the pixels are grouped into two sets: a first set which contains pixels which show the reference indicator, e.g. 210(x,y), and a second set which contains pixels which show the skin of the user's face 104, e.g. pixels 210 (1, 1); 210 (1, m); 210(n, 1) and 210(n,m) and their surrounding pixels.

Once the first set of pixels, i.e. those which are associated with a reference indicator 106a, and the second set of pixels, i.e. those which are associated with a user's face 104, have been delineated, an average of the colour values of the pixels in each set can be taken. In other words, an average colour value for the first set is calculated, and an average colour value for the second set is calculated. In other words, for each image, an average colour value for the reference indicator is calculated, and an average colour value for the user's face 104 is calculated. In a preferred embodiment, the median average of the colour values in each set is taken, although other averages such as the mean average may be used.

It will be appreciated that the median is a robust estimator. If an object other than the user's face/skin 104 or the reference indicator 106a appears in the image portion 108, for example a stray hair; if part of the user's skin or the reference indicator is obscured by a shadow; or if the image segmentation is not perfect, the median average is less likely to be affected than, for example, the mean average. While taking the median is a simple and effective method, it will be appreciated that other robust estimators such as the Hodges-Lehmann estimator or the interquartile mean may be used.

Once an average colour value for the reference indicator 104a and an average colour value for the user's face 104 have been obtained for each image portion 108, a colour relationship can be determined. The colour relationship is based on a relationship between the average object colour values and the average reference indicator colour values across each image portion which has been analysed, these image portions displaying a range of lighting conditions. The colour relationship may be a value representative of a difference between the measured colour of the reference indicator 106a and a measured colour of the user's face 104.

The colour relationship can be, for example a vector difference in a colour space. For example, in a colour space based on RGB values, such as the sRGB colour space, the vector difference may be represented by the following vector ratio: (−18%, +5%, −1%), where the number in brackets are differences in the red, green and blue channels respectively.

In an example, the colour relationship can be obtained by first calculating a ratio of the determined average colour value of the reference indicator 106a to the determined average colour value of the user's face 104 for each image portion. This results in a ratio value for each image portion. Processing each identified image portion in this manner results in a plurality of ratios which each describe the difference in measured colour between the reference indicator 106a and the user's skin surrounding the reference indicator 106a in a particular image portion. An average of these ratios can then be taken across all image portions to produce a ratio colour relationship. The ratio colour relationship describes the relationship between the colour of the reference indicator and the colour of the user's skin in terms of a ratio, and takes into account a variety of lighting conditions.

It will be appreciated that a ratio colour relationship is one example of a colour relationship. Taking an average of multiple ratios has been described, and this is a simple and effective method of determining a colour relationship between the measured colour of the user's skin and the measured colour of a reference indicator. Alternatively, more complicated methods can be used, for example a calculation as shown by the algorithm shown in Appendix A.

Because lighting can vary with the relative orientation of the user's face 104 and lighting sources, the reference indicators 106a-c are preferably either comprised of a substance which can be painted directly onto the object/unknown material, or a substance which comes in a form which is thin so it can be stuck directly onto the unknown material. In other words, the reference indicator 106a is preferably a thin layer of material which is placed directly onto the user's skin. Preferably the indicator 106a is also substantially flat across its face. Such a reference indicator 106a will follow the contour of the user's skin, thus ensuring the light is incident on the indicator 106a and the surrounding region of skin at a similar angle. This means that the reference indicator 106a has the same normals as the user's skin, as well as being subject to near identical lighting conditions as the user's skin. Using such a reference indicator 106a allows the method to best account for locally varying light conditions.

As will be described in more detail below, the reference indicator 106a is fabricated from a known material and has previously been photographed in various different lighting conditions along with other materials. This process allows the co-variation in colour behaviour between a number of different types of material in different lighting conditions to be analysed. In particular, the reference indicator 106a is one of a set of reference indicators, each reference indicator being comprised of a different material or otherwise having different colour attributes. A lighting colour relationship can be pre-determined for each pairing of the reference indicators. Then, when a colour relationship between a known reference indicator 106a and an unknown object 104 has been determined as described in detail above, the determined colour relationship can be compared to the pre-determined colour relationships in order to determine a best match between the unknown object 104 and the previously photographed objects/reference indicators.

Where the reference indicator 106a is a foundation, for example, the value can be compared to a reference table or library in order to determine whether the user is using the most flattering possible foundation, and can thus be used to give recommendations on which foundation a user should use.

For example, when a colour relationship is determined based on a known foundation colour and a user's skin, the skin having unknown colour attributes, the determined colour relationship between the known foundation and the user's skin is compared to a library of pre-determined colour relationships. A colour relationship is pre-determined between each of the known foundations. A library, matrix or reference table can store the colour relationship between pairs of any of several foundations. Thus, any of the known foundations can be used as suitable reference indicators.

As the type of foundation present in the images is known, the determined colour relationship can be compared to each of the colour relationships between the known foundation and every other foundation. The disclosed method allows the best match of the perceived colour of a user's skin and the perceived colour of a foundation product to be determined. This determination can be used to suggest a suitable foundation product for a user. Importantly, by taking into account a number of different lighting conditions, such a suggestion is more accurate, and the colour of the suggested foundation is more likely to match the colour of the user's skin across a broader range of lighting conditions.

A problem which may present itself when performing the above-described method is the existence of objects in an image portion other than the reference indicator and the unknown object to be colour-matched, for example stray hairs, un-representative skin blemishes, spectacles, etc. Similarly, an identified image portion may contain a shadowed region. This may impact the calculated median colour value for the reference indicator and/or the surrounding skin.

Figure 3:
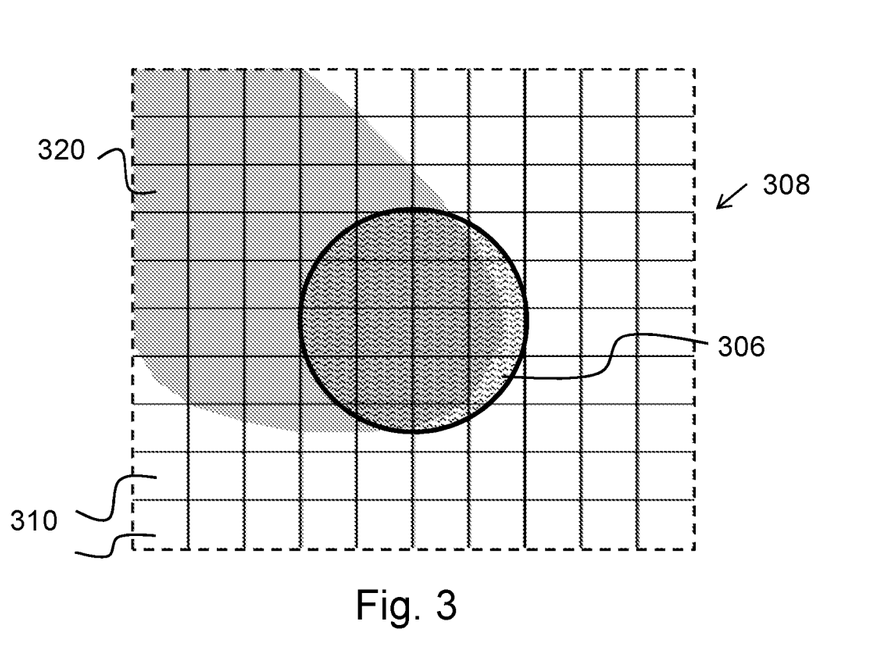
FIG. 3 depicts a portion of another image, in which a region of the image contains a shadow.

FIG. 3 shows an image portion 308 identified in a second image of the plurality of images. The second image is different than the image 102 shown in FIG. 1. Similar to the portion 108 of the first image 102 shown in FIG. 2, the portion 308 of the second image is comprised of a number of pixels 310 which show a user's face, and a number of pixels which show a reference indicator 306. The second image was taken when light on the user's face 104 was incident at a different angle than light incident on the user's face 104 in the first image 102. Because of the change of angle, when the second image was taken, part of the user's face 104 was in shadow. Therefore, the image portion 308 includes a shadowed region 320. It will be appreciated that the shadowed region 320 may be caused by light blocked by, for example, the user's nose or other facial features. In FIG. 3, the shadowed region 320 covers a portion of the reference indicator 306.

Depending on the regions of the image which it covers, a shadowed region 320 in an image portion 308 can affect the median average of the reference indicator set of pixels, the object set of pixels, or both sets of pixels. The shadowed portion 320 can, for example, make the calculated average values darker for one average than they would otherwise have been if the shadowed region 320 had not been present. For example, a shadow 320 covering more than 50% of the reference indicator will affect the median colour value for the reference indicator 306. In the example shown in FIG. 3, the shadowed region 320 covers more than 50% of the reference indicator 306 but less than 50% of the region of skin surrounding it. The median colour value for the reference indicator 306 will be affected, while the median colour value for the skin will not be. If the shadow affects just one set of pixels in this manner, then the two calculated colour averages can be considered to be representative of different lighting conditions.

To reduce errors associated with such shadowed regions 320 and other situations where the median is ill-posed, for example wherein identified image portions contain a stray hair or other object such as a skin blemish, it is possible to take an optional step of considering the amount of spread of the pixel colour values in each set. One way to consider the amount of spread of a set of values is to consider the standard deviation of each of the sets.

It will be appreciated that the pixels associated with the skin in FIG. 3 will demonstrate a wider range of colour values than, for example, the pixels which are associated with the skin in FIG. 2. This is because many of the pixels associated with the skin will have a 'darker' colour value due to the shadowed region. Therefore, the colour values of the pixels in the second set of pixels, i.e. the set of pixels associated with the skin, will have a larger standard deviation.

Accordingly, to address the errors associated with shadows/shadowed regions 320 which may be present in any of the images of the plurality of images, it is possible to introduce a threshold value for the standard deviation for one or both sets of pixels. For example, if the standard deviation of the set of pixels associated with a user's skin for a particular image 102 portion is too large, that image portion may be discounted from the analysis.

Alternatively, or in conjunction with a 'discount threshold', methods of down-weighting data resulting from image portions where the spread of colour values is above a threshold can be introduced. For example when using a ratio colour relationship, the weighted average ratio can be calculated as follows:

$$\text{Weighted average ratio} = \frac{\sum^i \text{Weight}_i * \text{ratio}_i}{\sum^i \text{Weight}_i}$$

where:

Weighted average ratio is the overall ratio colour relationship computed as a weighted average;

i is the set of all of the reference indicators and image portions;

$\text{weight}_i$ is a weight calculated from the spread of colour values in both sets of pixels (reference indicator and skin); and $\text{ratio}_i$ is the set of all determined ratios between the average colour values for the object and skin over all indicators and frames.

The threshold for the standard deviation, or other value representative of the amount of spread of the data, can be calculated by picking an optimal value to minimise an error in a known 'ground truth' test set, where the ground truth test set is a set of images, for example multiple videos, where the colour attributes of a user's skin is already known to a high degree of accuracy. In an example, if a large number of test videos are analysed and, using a first threshold for the standard deviation, the method identifies the correct foundation for a user's skin 98% of the time, and using a second threshold value for the standard deviation results in the method identifying the correct foundation 80% of the time, the first threshold is clearly more suitable.

Figure 4:
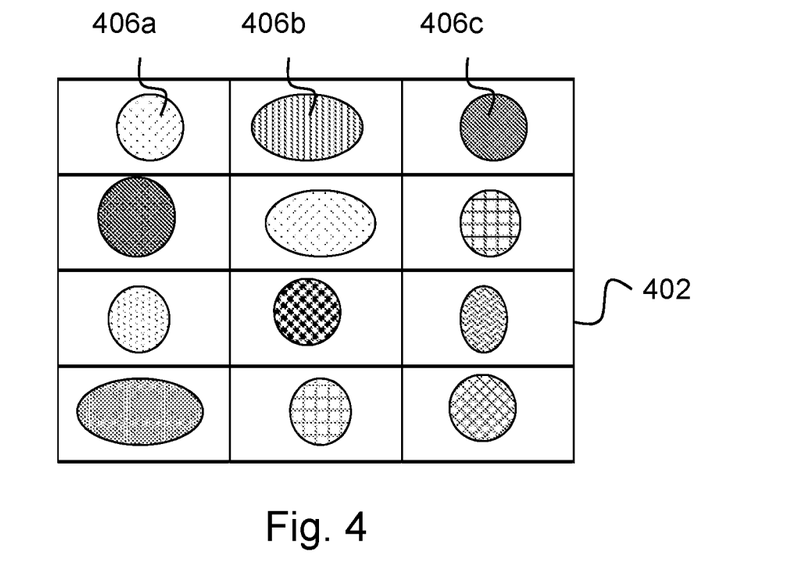
FIG. 4 depicts a schematic representation of a grid used to measure the colour behaviour of reference indicators in different lighting conditions.

FIG. 4 shows a paper grid 402 having a number of different dots of foundations 406a-c placed thereon. The foundations 406a-c have different colour attributes. The grid 402 is photographed in many different lighting conditions. Such a grid 402 and method can be used to determine how the foundation colours co-vary under various lighting conditions. In this way, information regarding a set of different types of reference indicator (e.g., foundations 406a-c) can be gathered.

This information can be used to calculate how the measured colours of the foundation dots co-vary. This can be as simple as a fixed ratio between the measured colours of the foundations, or something more complex such as a linear relationship or an exponential relationship.

In particular, a lighting colour relationship can be determined, in the manner detailed above, for each combination of foundations 406a-c. Such a colour relationship takes into account the behaviour of the measured colour of the foundations 406a-c across a range of lighting conditions. Thus, a library or reference table of lighting colour relationships can be produced, comparison with which allows the colour of a user's skin to be matched with the colour of one of the foundations 406a-c.

In an example method of building up such a library, dots of foundation 406a-c are placed on the grid 402. Multiple images/photographs of the grid 402 are taken, each in different lighting conditions. Changing the lighting conditions may include changing the frequencies of light incident on the grid 402.

Image segmentation techniques are used to identify regions of the grid 402 associated with each blob of foundation 406a-c on the grid 402. The grid 402 ensures that each dot can be automatically identified using software, for example software arranged to perform the Graph Cuts techniques explained above. An average colour for each type of foundation 406a-c in each image is calculated. For example, the average can be a median average of pixel colour values for each pixel which has been identified as associated with a particular blob of foundation 406a-c.

Once average colours have been built up for the foundations 406a-c for multiple images across different lighting conditions, a colour relationship between each pairing of the foundations can be determined. In a simple embodiment, the colour relationship between a first foundation 406a and a second foundation 406b can be a best fit ratio between the first and second foundations 406a, b.

It will be appreciated that, once a library of colour relationships between various types of foundation 406a-c has been established in this manner, any of the foundation types 406a-c can be used as a suitable reference indicator, provided information about which foundation type is present in the images to be processed is provided. In other words, the type of reference indicator which is imaged with the object should be 'known'.

Figure 5:
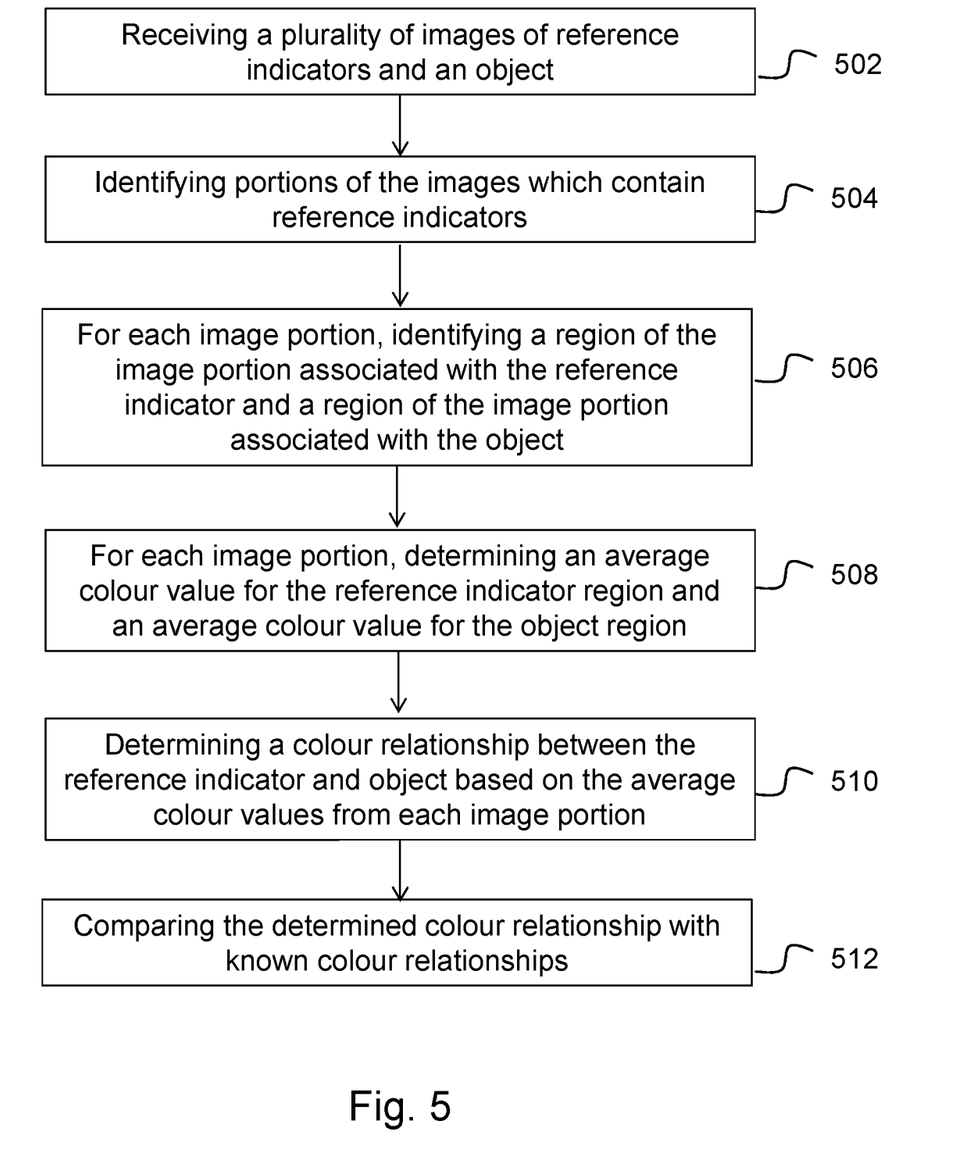
FIG. 5 depicts a flowchart illustrating a disclosed approach.

The disclosed method will now briefly be described in relation to the flowchart shown in FIG. 5. The method is suitable to be carried out by a processor.

At 502, a plurality of images is received by the processor. Each of the images show a reference indicator and an object.

At 504, portions of the images which contain reference indicators are identified. The portions contain a region associated with a reference indicator, and a region associated with the object.

At 506, the region of the image portion associated with the reference indicator is identified, and the region of the image portion associated with the object is identified.

At 508, for each image portion, an average colour value for the reference indicator region is determined, and an average colour value for the object region is determined.

At 510, a colour relationship between the reference indicator and object is determined based on the average colour values from each image portion.

At 512, the determined colour relationship is compared with known colour relationships. In a preferred embodiment, based on the comparison, which of a set of different types of reference indicator has the closest colour attributes to the object can be identified.

The methods described above reduce errors in the colour matching of a known object, for example a reference indicator, with an unknown object. The reference indicator and the unknown material are photographed together in varying lighting conditions, which helps to counter metameric failure. Thus, a more accurate colour match is produced, which is suitable for use in a wide range of lighting conditions.

It will be understood that the above description of specific embodiments is by way of example only and is not intended to limit the scope of the present disclosure. Many modifications of the described embodiments, some of which are now described, are envisaged and intended to be within the scope of the present disclosure.

As discussed above, it is possible to obtain a suitable plurality of images for analysis by analysing a video. The user can place one or several dots of foundation on their face, and then take a video of themselves while turning in a circle. Of course, it will be appreciated that the user can turn through a half circle or other large angle during the video. Rotation of the face and reference indicators in this manner has been found to produce images having a large variance in lighting conditions, which in turn results in a more accurate result.

Of course, it will also be appreciated that a video of a user's face while they walk around in different lighting conditions can also be used, as can a video in which the user does not move but the lighting conditions are externally varied, for example by changing the lighting. It will also be appreciated that a video is not essential, and the plurality of images can simply be a plurality of images. These images can be, for example, uploaded by a user, and can show their face with the reference indicator placed thereon in a number of lighting conditions.

It will be appreciated that a single image could be used in the above method, provided multiple reference indicators of the same type are placed on an object. This approach will work best if different regions of the object on which the reference indicators are placed are placed in different lighting conditions.

The reference indicators need not be foundation, but may be, for example, pieces of paper which can be cut out and held against or stuck on to regions of the user's face. Similarly, in examples where the task is to colour match the user's skin colour with a foundation product, while the method has primarily been described in relation to a user's face it will be appreciated that any region of a user's skin can be used.

The method has been described in relation to matching the colour of a user's skin with a suitable colour of foundation.

In this embodiment, a blob or dot of foundation on a user's face, or indeed multiple blobs or dots of foundation, can be used as suitable reference indicators. However, it will be appreciated that the approaches detailed herein are not limited to this specific embodiment, or to the field of cosmetics. The method is applicable to any situation in which the task is to obtain an accurate matching of the colour attributes of an unknown object to the colour attributes of one of a set of known objects. For example, the method could be used to match the colour attributes of an unknown ink to colour attributes one of a set of known types of inks, or to match colour attributes of a fabric to one of a range of possible a plastic trims for a car seat, each plastic trim having different colour attributes.

The approaches described herein may be embodied on a computer-readable medium, which may be a non-transitory computer-readable medium. The computer-readable medium may carry computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

APPENDIX 1

A simplified version of a suitable software algorithm which can be used to calculate a colour relationship is provided below.

AverageProduct=average rgb value of product over all frames
AverageSkin=average rgb value of skin over all frames
AverageLight=average product/average rgb value of product over all training data
AverageSkinInAverageLight=AverageSkin/AverageLight
For each possible other product:
OtherProduct=average of transforming each video frame one by one from known product to other product
OtherProductInAverageLight=OtherProduct/AverageLight
Distance=perceptual distance between (OtherProductInAverageLight, AverageSkinInAverageLight)

The other products are those in the library of known materials/reference indicators. The best matches between the colour attributes of the object and the colour attributes of the other products are the ones with the lowest distance value. The transformations are performed frame by frame, i.e. image by image, and then the average is taken.

The invention claimed is:

1. A computer-implemented method for evaluating which of a set of different types of reference indicators has colour attributes closest to those of an object, wherein each respective type of reference indicator has different colour attributes, the method comprising:
    determining a colour relationship between the object and a plurality of reference indicators of a first type, wherein the plurality of reference indicators of the first type are placed directly on a plurality of regions of the object, wherein the colour relationship is determined by analysing a plurality of image portions, each image portion comprising one of the plurality of regions of the object and at least one of the plurality of reference indicators of the first type, wherein the image portions each have different lighting characteristics; and
    comparing the determined colour relationship to known colour relationships associated with the reference indicators of the first type, each known colour relationship representing a relationship between the reference indicators of the first type and another reference indicator of the set of different types of reference indicators, to identify which of the set of different types of reference indicators has colour attributes closest to those of the object,
    wherein the image portions are portions of the at least one image, wherein the image portions have been identified as comprising at least one of the plurality of reference indicators of the first type.

2. The method of claim 1, further comprising receiving image data representative of the at least one image, the at least one image comprising the object and at least one of the plurality of reference indicators of the first type.

3. The method of claim 1, wherein the at least one image is a plurality of images, each respective image of the plurality of images comprising the object and at least one of the plurality of reference indicators of the first type.

4. The method of claim 3, wherein the plurality of images are still frames from a video.

5. The method of claim 4, wherein the video depicts the object and at least one of the plurality of reference indicators of the first type rotating together.

6. The method of claim 1, wherein the at least one image comprises the object and the plurality of reference indicators of the first type.

7. The method claim 1, wherein the known colour relationships are pre-determined based on an analysis of the set of different types of reference indicators in different lighting conditions.

8. The method of claim 1, further comprising analysing the at least one image to identify the plurality of image portions wherein identifying the plurality of image portions comprises manual identification of a reference indicator in a first image of the plurality of images.

9. The method of claim 1, further comprising analysing the at least one image to identify the plurality of image portions, wherein identifying the plurality of image portions comprises automatic identification of a reference indicator in a first image of the plurality of images.

10. The method of claim 1, wherein the at least one image is a plurality of images comprising still frames from a video, the method further comprising:
    tracking the movement of the object in the video; and
    identifying the plurality of image portions in the plurality of images based on said tracking and a manual or automatic identification of at least one reference indicator in the first image.

11. The method of claim 1, wherein each respective image portion comprises a reference indicator region associated with a reference indicator of the first type, and an object region associated with the object.

12. The method of claim 11, wherein the reference indicator region for each respective image portion comprises a first set of pixels associated with a reference indicator of the first type, and the object region for each respective image portion comprises a second set of pixels associated with the object.

13. The method of claim 11, further comprising determining, for each respective image portion, an average colour for the reference indicator region and an average colour for the object region, and wherein the average colour for the reference indicator region is an average of the colour values of the pixels associated with the reference indicator region, and the average colour for the object region is an average of the colour values of the pixels associated with the object region.

14. The method of claim 13, wherein the average colours are determined using a median average of pixel colour values.

15. The method of claim 13, further comprising determining a spread of the pixel colour values associated with the reference indicator region, and/or a spread of the pixel colour values associated with the object region, and discarding the image portions wherein the spread is above a threshold spread value.

16. The method of claim 15, wherein the threshold spread value is pre-determined based on an analysis of test image portions, wherein an object comprised in the test image portions has known colour attributes.

17. The method of claim 13, the method further comprising determining the colour relationship based on the average colour values from each image portion.

18. A non-transitory computer readable medium comprising computer-executable instructions which, when executed by a processor, cause the processor to perform a computer-implemented method for evaluating which of a set of different types of reference indicators has colour attributes closest to those of an object, wherein each respective type of reference indicator has different colour attributes, the method comprising:
  determining a colour relationship between the object and a plurality of reference indicators of a first type, wherein the plurality of reference indicators of the first type are placed directly on a plurality of regions of the object, wherein the colour relationship is determined by analysing a plurality of image portions, each image portion comprising one of the plurality of regions of the object and at least one of the plurality of reference indicators of the first type, wherein the image portions each have different lighting characteristics; and
  comparing the determined colour relationship to known colour relationships associated with the reference indicators of the first type, each known colour relationship representing a relationship between the reference indicators of the first type and another reference indicator of the set of different types of reference indicators, to identify which of the set of different types of reference indicators has colour attributes closest to those of the object.

19. A computer system comprising at least one processor and at least one memory, the system configured to perform a computer-implemented method for evaluating which of a set of different types of reference indicators has colour attributes closest to those of an object, wherein each respective type of reference indicator has different colour attributes, the method comprising:
  determining a colour relationship between the object and a plurality of reference indicators of a first type, wherein the plurality of reference indicators of the first type are placed directly on a plurality of regions of the object, wherein the colour relationship is determined by analysing a plurality of image portions, each image portion comprising one of the plurality of regions of the object and at least one of the plurality of reference indicators of the first type, wherein the image portions each have different lighting characteristics; and
  comparing the determined colour relationship to known colour relationships associated with the reference indicators of the first type, each known colour relationship representing a relationship between the reference indicators of the first type and another reference indicator of the set of different types of reference indicators, to identify which of the set of different types of reference indicators has colour attributes closest to those of the object.

* * * * *